Figure 1:
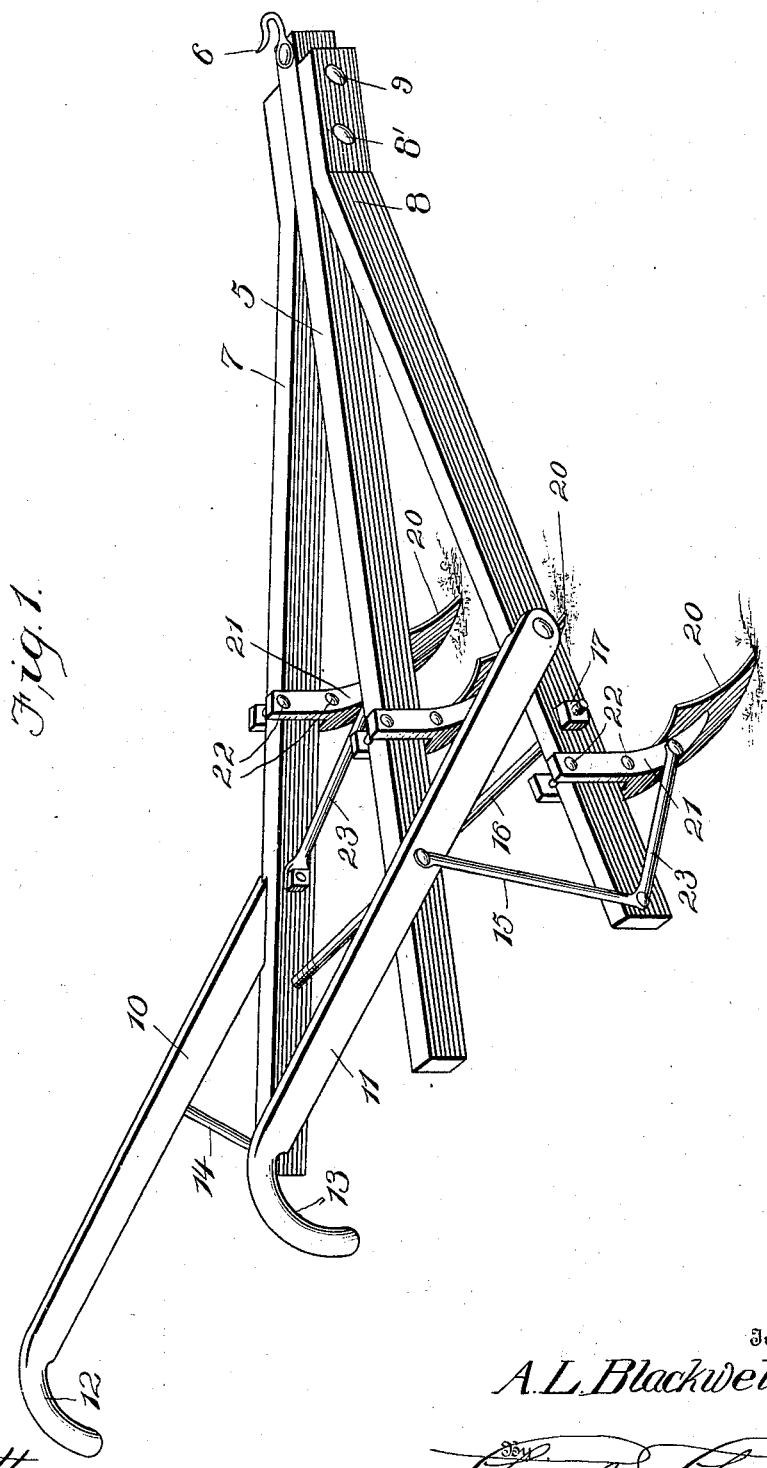

No. 691,741. Patented Jan. 28, 1902.
A. L. BLACKWELL.
COMBINED HARROW, CULTIVATOR, AND PLOW.
(Application filed June 5, 1901.)
(No Model.) 2 Sheets—Sheet 1.

Witnesses
T. P. Britt

Inventor
A. L. Blackwell
Chanalee & Chanalee
Attorneys

No. 691,741. Patented Jan. 28, 1902.
A. L. BLACKWELL.
COMBINED HARROW, CULTIVATOR, AND PLOW.
(Application filed June 5, 1901.)
(No Model.) 2 Sheets—Sheet 2.
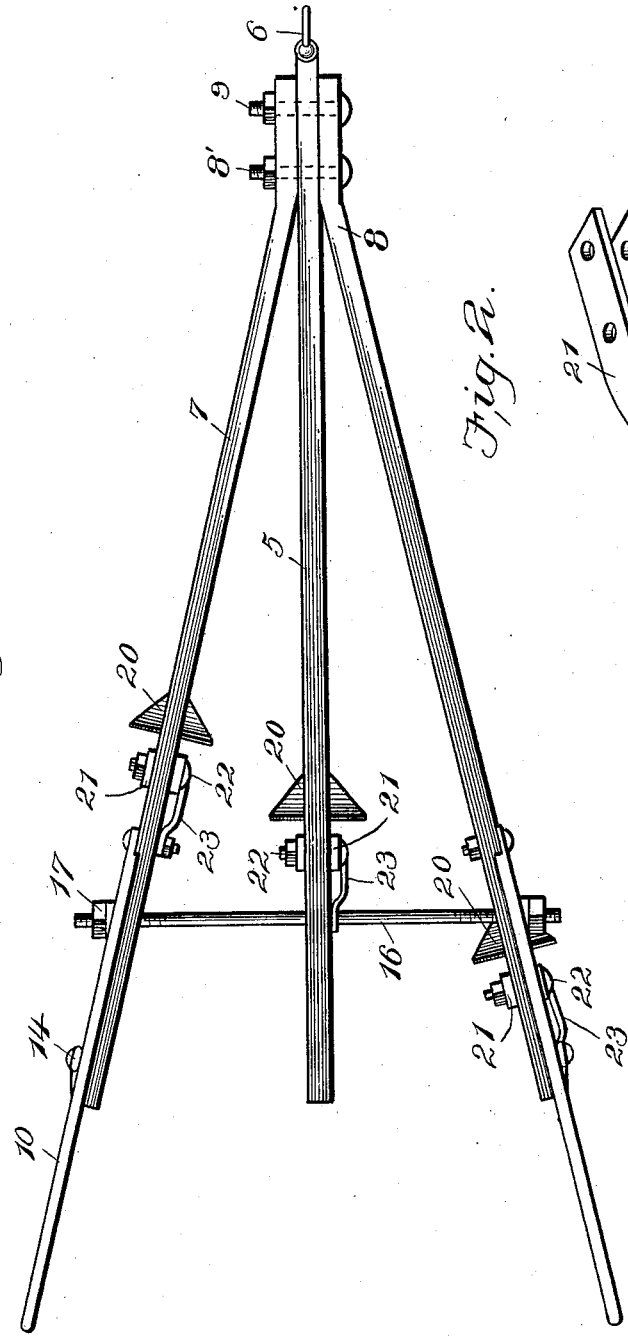
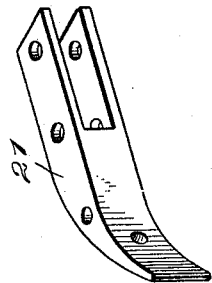
Witnesses
T. P. Britt
Harry Ellis Chandlee
Inventor
A. L. Blackwell,
Chandlee & Chandlee
Attorneys

UNITED STATES PATENT OFFICE.

AUSTIN L. BLACKWELL, OF LEAKESVILLE, MISSISSIPPI.

COMBINED HARROW, CULTIVATOR, AND PLOW.

SPECIFICATION forming part of Letters Patent No. 691,741, dated January 28, 1902.

Application filed June 5, 1901. Serial No. 63,255. (No model.)

*To all whom it may concern:*

Be it known that I, AUSTIN L. BLACKWELL, a citizen of the United States, residing at Leakesville, in the county of Greene, State of Mississippi, have invented certain new and useful Improvements in a Combined Harrow, Cultivator, and Plow; and I do hereby declare the following to be a full, clear, and exact description of the invention, such as will enable others skilled in the art to which it appertains to make and use the same.

This invention relates to agricultural implements; and it has for its object to provide an implement which may be adjusted for treating rows having different degrees of separation and which by slight changes may be converted to form a harrow, a cultivator, or a plow.

Further objects and advantages of the invention will be understood from the following description.

In the drawings forming a portion of this specification, and in which like numerals of reference indicate similar parts in the several views, Figure 1 is a perspective view showing the implement adjusted for use as a cultivator. Fig. 2 is a detailed perspective view showing one of the standards from which the cultivator-teeth are hung. Fig. 3 is a plan view of the implement.

Referring now to the drawings, the implement comprises a frame including a central beam 5, which is provided at its forward end with a clevis 6 for attachment of a singletree or a doubletree, as may be desired, and attached to the forward portion of which in the rear of the clevis are the rearwardly-diverging side beams 7 and 8, the forward ends of which are bent to lie against the side faces of the central beam and in which positions they are held by the bolts 8' and 9, passed through alining perforations in the beams.

Bolted to the beams 7 and 8 are the handles 10 and 11, which extend upwardly and rearwardly beyond the beams, where are formed the grips 12 and 13. Brace-rods 14 and 15 are attached to the handles and to the rear ends of the beams 7 and 8.

Formed laterally through the beams 5, 7, and 8 in the rear of the handle are alining perforations, in which is engaged a tie-rod 16, and engaged with this tie-rod at opposite sides of the beams 7 and 8 are nuts 17, so that by first loosening the bolts 8' and 9 the nuts 17 may be adjusted to draw the rear ends of the beams 7 and 8 inwardly to vary the width of the frame of the implement.

Cultivator-teeth 20 are provided and are supported upon the standards 21, the upper portions of which are bifurcated to straddle the beams 5, 7, and 8, the bifurcations of the standards being perforated to receive bolts 22, engaged therewith above and below the beams, so that the bifurcations may be drawn inwardly against the beams with sufficient friction to hold the standards against displacement. The cultivator-teeth are held to the standards by bolts, as shown, so that the cultivator-teeth may be removed when desired and other teeth or plowshares may be substituted therefor, according to the work to be performed.

From the lower ends of the standards extend braces 23 upwardly and rearwardly, and the brace of the standard on the beam 7 is engaged by the same bolt that holds the forward end of a handle 10 to the beam, the standard being in advance of the handle. The brace of the middle standard is engaged by the rod 16, in advance of which the standard lies, while the brace of the third standard, which is on the beam 8, is engaged by the same bolt which holds the handle-brace 15 to the beam 8.

It will thus be seen that there is provided a construction which is extremely durable, which is simple and is cheap of manufacture, and which may be converted for specific operations and may be adjusted for most efficient work under different conditions, it being understood that in practice modifications of the specific construction shown may be made and that any suitable materials and proportions may be used for the various parts without departing from the spirit of the invention.

What is claimed is—

A farm implement of the class described comprising a frame including a central beam and outside beams mutually connected at their forward ends and diverging rearwardly, a tie-rod connecting the rear end portions of the beams, handles bolted to the outside beams, braces bolted to the handles and to the rear ends of the outside beams and braces for the standards; the standards being disposed one in front of a handle and having its brace connected to the bolt of the handle, one on the central beam between the handles and having its brace connected to the tie-rod and one behind the second handle and having its brace connected to the bolt of the brace of that handle behind which the standard is disposed.

In testimony whereof I hereunto sign my name, in the presence of two subscribing witnesses, on the 2d day of May, 1901.

AUSTIN L. BLACKWELL.

Witnesses:
 ALBERT HARRISON,
 WALTER L. BLACKWELL.